Dec. 26, 1967 W. D. MURPHY 3,360,603

SYNCHRONOUS DEMODULATOR

Filed Aug. 26, 1965 2 Sheets-Sheet 1

INVENTOR.
WILLIAM D. MURPHY
BY Robert E. Strauser
ATTORNEY

INVENTOR.
WILLIAM D. MURPHY
BY
Robert E. Strauss
ATTORNEY

United States Patent Office
3,360,603
Patented Dec. 26, 1967

3,360,603

SYNCHRONOUS DEMODULATOR

William D. Murphy, Emporium, Pa., assignor to Sylvania Electric Products Inc., a corporation of Delaware Filed Aug. 26, 1965, Ser. No. 482,701
4 Claims. (Cl. 178—5.4)

ABSTRACT OF THE DISCLOSURE

A color television receiver demodulation system including a pair of demodulator tubes having reference oscillation signals applied to each one of the pair by way of a bias network, a chrominance signal coupled to both demodulator tubes by way of a common impedance whereacross is developed a third color difference signal, and means including an amplifier coupling the third color difference signal to a color picture tube.

This invention relates to synchronous demodulator circuits for a color television receiver and more particularly to a matrix demodulator circuit wherein three color difference signals are derived from a chrominance signal.

The prior art suggests a number of matrix demodulators circuits wherein a pair of color difference signals are demodulated and a matrix circuit is utilized to derive a third color difference signal therefrom. For example, one known system, often referred to as the "x–z" system, includes a pair of demodulating amplifiers and three color difference amplifiers. The demodulating amplifiers provide a pair of color difference signals which are applied to a pair of color difference amplifiers having an output signal applicable to an image reproducing unit. The color difference amplifiers include a common cathode impedance wherefrom a third color difference signal is derived and applied to a third color difference amplifier having an output signal applicable to an image reproducing unit. Obviously, a system requiring the above-listed amplifying stages leaves much to be desired with regard to circuit components, circuit design simplification, and cost.

Another matrix demodulator circuit of which applicant is aware includes a pair of demodulating amplifiers from which are obtained a pair of color difference signals directly applicable to an image reproducing unit. These two color difference signals are matrixed in a load circuit common to both amplifiers to provide a third color difference signal having a negative polarity with respect to the two color difference signals. The third color difference signal is applied to the control grid of a third amplifier having an output signal applicable to an image reproducing unit.

While the above circuitry has many advantages over prior known systems, it has been found that the system has an inherent disadvantage with respect to maximum efficiency and maximum obtainable circuit output due to the matrix network. More specifically, assuming that a demodulator tube is driven to cut off by incoming chroma information, the plate voltage of the demodulator tube should rise to the value of the supply voltage for maximum output from the circuit. However, the matrix network in conjunction with a resistor in the grid circuit of the third amplifier form a voltage divider which prevents the plate voltage of the demodulator tube from reaching the supply voltage value. Thus, maximum efficiency and signal output is unattainable.

Other known matrix demodulation systems include the utilization of sheet-beam tubes and multi-control grid tubes. In the sheet-beam tubes, a chrominance signal is applied to the control grids and a reference oscillation signal to deflector plates while in the multi-control grid tubes, the chroma signal is applied to one of the control grids and a reference oscillation signal to the other control grid. In either case, the components are expensive, difficult to fabricate with uniformity, and leave much to be desired with respect to sensitivity of the system.

Therefore, it is an object of this invention to provide an improved synchronous demodulator system for developing three color difference signals from a chrominance signal.

Another object of the invention is to enhance the signal output amplitude obtainable from a demodulator system permitting the utilization of smaller and less expensive system components.

A further object of the invention is to provide an improved demodulation system utilizing inexpensive and noncritical circuit components and having an enhanced signal output.

These and other objects are achieved in one aspect of the invention by an impedance common to the cathodes of a pair of demodulator tubes wherein flows a current proportional to a demodulated signal produced in the plate circuit of both tubes. A first and second color difference signal is provided at the anodes of the first and second demodulator tubes and a third color difference signal at the junction of the cathodes is processed through an amplifier to provide the third color difference signal of a magnitude sufficient for application to an image reproducing unit.

For a better understanding of the present invention, together with other and further objects, advantages and capabilities thereof, reference is made to the following disclosure and appended claims in connection with the accompanying drawings in which:

Figure 1:
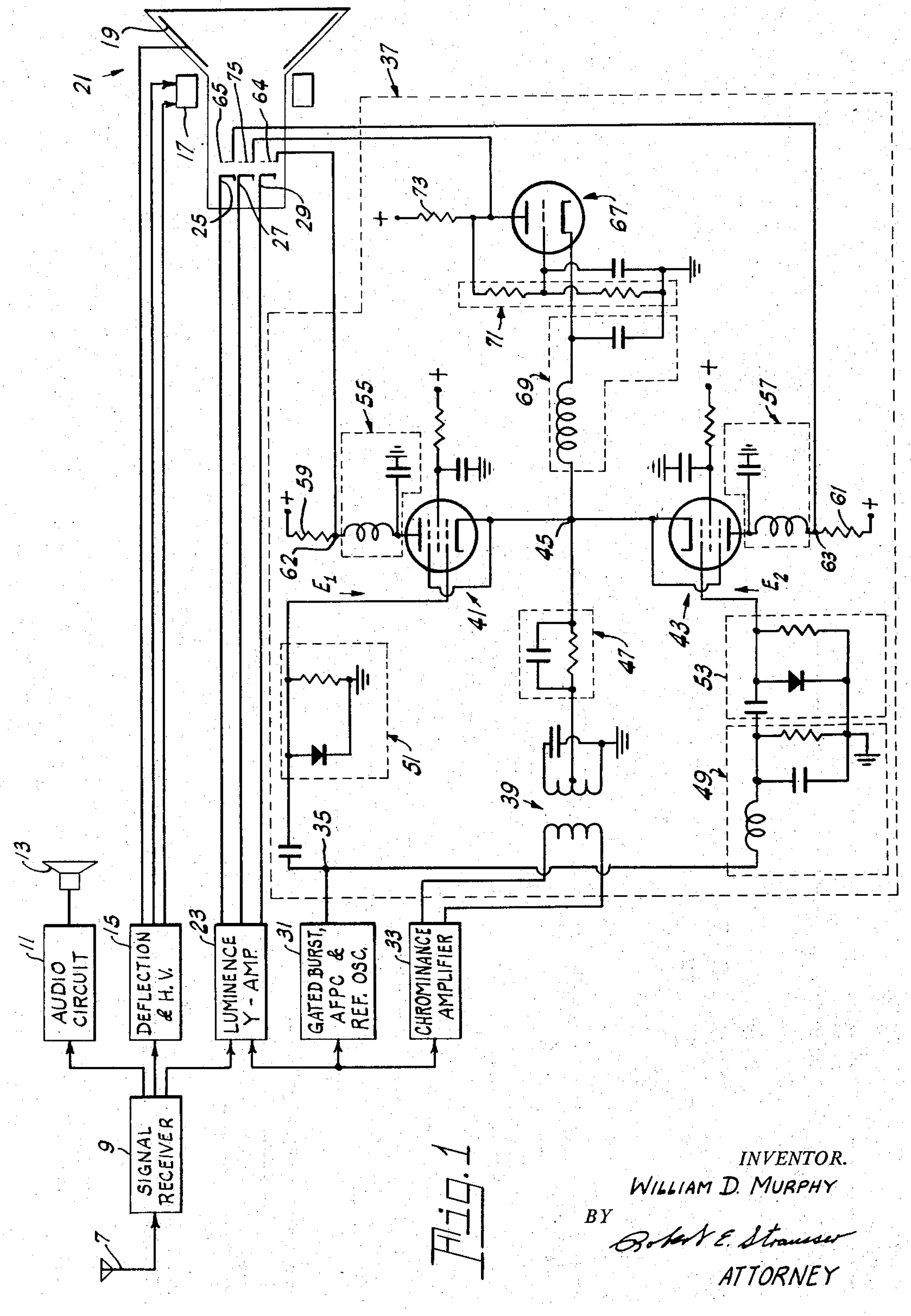
FIG. 1 is a block diagram of a color television receiver including one embodiment of the present invention in schematic form.

Referring to color television receiver diagram of FIG. 1, a transmitted television signal is received at the antenna 7 and conveyed to the signal receiver 9 wherein the signal is amplified and altered in frequency in the normal manner by the RF amplifiers, converters, and IF amplifiers. A sound signal portion of the received signal is applied to the usual audio circuitry 11 and to a loudspeaker 13. The output signal from the receiver 9 is processed by deflection and high voltage circuitry 15 and applied to the deflection yoke 17 and a high voltage anode electrode 19 of a color picture tube 21.

The output signal from the signal receiver 9 is also applied to a luminence channel 23 wherein the signal is amplified to provide luminence output signals which are appropriately varied and applied to all three cathodes 25, 27, and 29 of the color picture tube 21. Also, a processed signal from the luminence channel 23 is applied to a gated burst amplifier, automatic frequency and phase control, and reference oscillation signal generator 31 as well as to a chrominance amplifier 33. The output signal from the reference oscillation signal generator 31 is coupled to a terminal 35 provided a signal input source for a synchronous demodulator 37. A chroma output signal from the chrominance amplifier 33 is coupled to a transformer 39 providing a source of chrominance signals for the demodulator 37.

The demodulator 37 employs a pair of multi-grid electron tubes 41 and 43. The cathodes of the tubes 41 and 43 have a common junction 45 and the chroma signal at the transformer 39 is applied thereto by way of a common impedance 47. The reference oscillation or demodulating signal available at the input terminal 33 is AC coupled to the control grid of a first tube 41 and AC coupled through a phase shifting network 49 to the control grid of the second tube 43. Also, a bias network 51 is coupled to the control grid of the first demodulator tube 41 and a similar bias network 53 is coupled to the control grid of the second demodulator tube 43.

The screen grids of both tubes 41 and 43 are coupled to a positive voltage source (+) and the suppressor grids of both tubes 41 and 43 are connected to the cathodes respectively. The anodes of both tubes 41 and 43 are coupled through low pass filters, 55 and 57 respectively, and a load resistor, 59 and 61 respectively, to a positive voltage source (+). The first demodulator tube 41 has an output circuit connected from a jointure 62 intermediate the filter 55 and the load resistor 59 and 61 respectively, to a positive voltage source (+). The first demodulator tube 41 has an output circuit connected from a jointure 62 intermediate the filter 55 and the load resistor 59 to a grid 64 of the picture tube 21. The second demodulator tube 43 has an output circuit connected from a jointure 63 to a second grid 65 of the picture tube 21.

A third amplifier 67 has the cathode thereof coupled to the jointure 45 of the cathodes of the demodulator tubes 41 and 43 by way of a low pass filter 69. The grid of the third amplifier 67 is AC coupled circuit ground and to a voltage divider bias network 71 intermediate the anode and amplifier 67 and the above-mentioned circuit ground. The anode of the third amplifier 67 is coupled through a load resistor 73 to a positive voltage source (+) and to a third grid 75 of the picture tube 21.

In the operation of the synchronous demodulator 37, a chroma signal which includes R–Y and B–Y color difference information is applied to the cathodes of both demodulator tubes 41 and 43 from a chrominance source 39 by way of a common impedance 47. Also, a reference oscillation signal or demodulating signal is applied to each of the control grids of the tubes 41 and 43. The combining of these signals in the demodulating tubes 41 and 43 provides a demodulated color difference signal in a first phase representative of R–Y in the anode circuit of the first tube 41 and a demodulated color difference signal in a second phase representative of B–Y in the anode circuit of the second tube 43.

Figure 2:
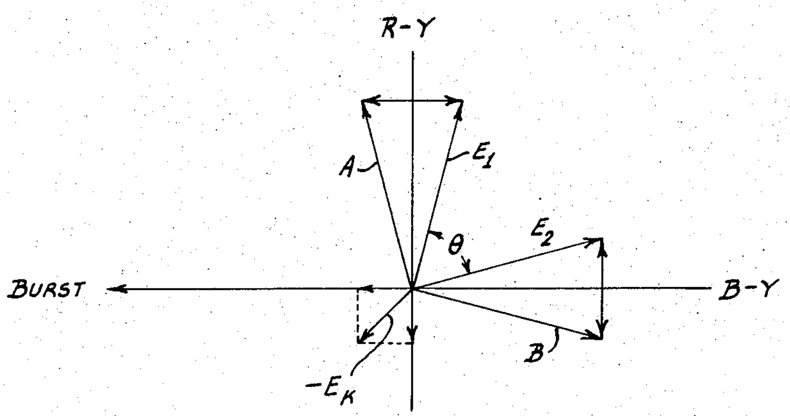
FIG. 2 is a vector diagram relating the phase relationship of two of the color difference signals with respect to a reference oscillation signal applied to the demodulator tubes and the usual burst and demodulation axes.

Referring to the vector diagrams of FIG. 2, there is illustrated the well-known quadrature phase relationship of a color burst signal, an R–Y color difference signal at a first phase lagging the burst signal by 90°, and a B–Y color difference signal at a second phase lagging the R–Y signal by 90°. Assuming that the synchronous demodulator 37 of FIG. 1 does not have an impedance 47 common to the cathodes of both tubes 41 and 43 and that a chroma signal is applied independently to these cathodes, application of a reference oscillation signal in quadrature to the grids of the tubes 41 and 43 would serve to provide a demodulated chroma signal in the output of the first amplifier 41 in a first phase coincident with the R–Y axis and a demodulated chroma signal in the output of the second amplifier 43 in a second phase coincident with the B–Y axis.

However, with the impedance 47 common to the cathodes of both tubes 41 and 43, it follows that current flow due to an R–Y color difference signal will be introduced into the cathode circuit of the B–Y amplifier 43 while current flow due to a B–Y color difference signal will be introduced into the cathode circuit of the R–Y amplifier. Further, this undesired current flow or "crosstalk" signal $-E_k$ will be in reverse polarity to the desired color difference signals.

As can be seen in FIG. 2, a chrominance signal along the R–Y axis combined with a "crosstalk" signal or negative-polarity B–Y signal would tend to provide a demodulated output signal A in the output circuit of the R–Y color difference amplifier 41. In a similar manner, a negative polarity R–Y signal would tend to provide a demodulated output signal B in the output circuit of the B–Y color difference amplifier 43. Therefore, by altering the phase of the reference oscillation signal applied to the grid of the R–Y color difference amplifier 41 to a fourth phase $E_1$, the negative B–Y portion of the crosstalk signal $-E_k$ is effectively cancelled and the demodulated signal in the output circuit of the R–Y color difference amplifier 41 coincides with the R–Y axis. Similarly, altering the phase of the reference oscillation signal applied to the grid of the B–Y color difference amplifier 43 to a fifth phase $E_2$ causes cancellation of the negative-going R–Y portion of the crosstalk signal $-E_k$ and serves to provide a demodulated signal in the output circuit of the B–Y color difference amplifier 43 coincident with the B–Y axis.

Since the impedance 47 common to the cathode circuit of both demodulator tubes 41 and 43 has a relatively low value, the crosstalk signal $E_k$ developed thereacross has a relatively low value. As a result, a relatively small phase correction in the reference signal applied to the grids of the tubes 41 and 43 is required. For example, in the embodiment of FIG. 1, a phase angle in the range of about 75 to 85 degrees between the fourth phase $E_1$ and the fifth phase $E_2$ is applicable and appropriate.

Figure 3:
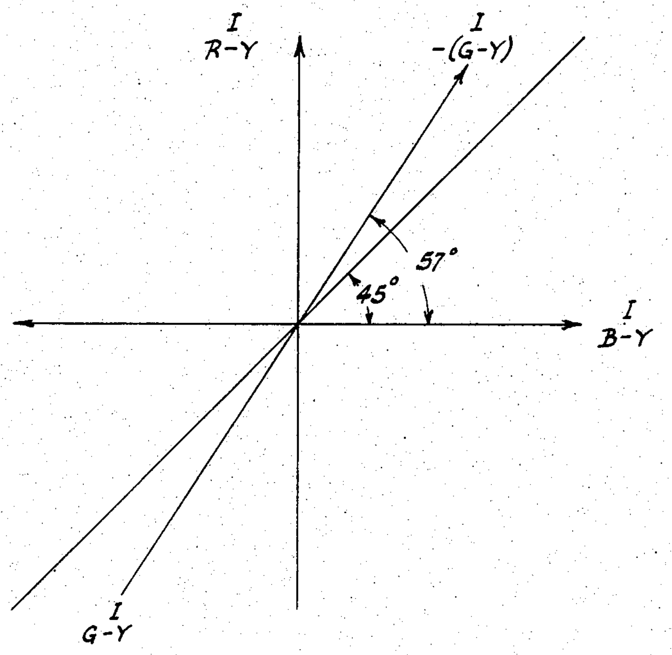
FIG. 3 is a vector diagram relating the phase relationship of current flow at a jointure common to the cathodes of a pair of demodulator amplifiers.

Referring to the vector representation of FIG. 3 which serves to illustrate the currents flowing in the cathode circuitry of the demodulator tubes 41 and 43, it can be readily understood that the magnitude of the current flow is largely dependent upon the reference oscillation signals applied to the control grids of the tubes 41 and 43 and to a much lesser extent upon the applied chrominance signal. Thus, current flow through the demodulator tube 41 may be represented by a vector extending along an R–Y axis. In a similar manner, current flow through the demodulator tube 43 may be represented by a vector extending along the B–Y axis. These vectors would be substantially equal so long as the applied reference oscillation signals are substantially of the same magnitude and in quadrature relationship and the gains of the tubes 41 and 43 were substantially equal. Moreover, the magnitude of the signals appearing in the output circuits of the tubes 41 and 43 are readily alterable by methods well known in the art.

Since the current flowing in both tubes 41 and 43 are substantially equal and they both flow through a common impedance 47, it follows that the resultant current flowing through the common impedance 47 will have a phase angle of substantially 45° with respect to the R–Y and B–Y axes. Since this resultant current flow through the common impedance 47 is to be utilized to provide a G–Y color difference signal which has an axis at a phase angle of about 57° with respect to the B–Y axis, it is highly desirable that the resultant current have a phase angle not at 45° but at 57° coincident with the G–Y axis.

It can be seen that the phase angle of the resultant current can be readily shifted from 45° to 57° by simply altering the conduction of the demodulator tubes 41 and 43 with respect to each other. As a result, the combined current flowing through the common cathode impedance 47 is shifted to a third phase at an angle of about 57° with respect to the B–Y axis and coincident with the G–Y axis.

In the specific embodiment of FIG. 1, this alteration in conduction of the demodulator tubes 41 and 43 with respect to each other is readily accomplished by simply varying the component values in the bias networks 51 and 53 respectively. For example, a variation in the ratio of the resistive components in the bias networks 51 and 53 in the range of about 6:1 to 7:1 has been found appropriate. Obviously, numerous other techniques for varying the gain of the demodulator tubes 41 and 43 with respect to each other such as altering the screen potentials or including an additional bias resistor in the cathode circuit of one of the demodulator tubes are equally applicable.

Thus, a G–Y color difference signal at a third phase coincident with a G–Y axis is developed across the impedance 47 common to the cathodes of the demodulator tubes 41 and 43. This G–Y signal is developed not only from the current flow to both demodulator tubes 41 and 43 because of the reference oscillation signals applied thereto but also is modulated in accordance with the chrominance signals applied to the impedance 47 by way of the transformer 39.

This G–Y color difference signal is coupled from the jointure 45 of the cathodes of the tubes 41 and 43 by way of a low pass filter 69 to the cathode of the amplifier 67. Therein, the AC coupling of the grid of the amplifier 67 to circuit ground in combination with the voltage divider bias feedback network 71 serves to provide an amplified and stabilized G–Y color difference signal without phase inversion in the anode output circuit of the amplifier 67, which may be directly coupled to a third grid 75 of the color picture tube 21.

Referring to the demodulation circuitry of FIG. 1, assume a pulse envelope of subcarrier signal at a positive phase angle representative of a color close to red were received. The chrominance signal would appear at the transformer 39 and be transmitted by way of the capacitor of the common impedance 47 to the jointure 45 of the cathodes of the demodulator tubes 41 and 43. The positive-going portion of the pulse envelope is applied to the cathode of the demodulator tube 41 and in combination with a reference oscillation signal of proper phase applied to the control grid thereof serves to reduce the current flow therethrough. This reduced current flow in the tube 41 causes the potential in the anode circuit to increase providing a signal at an R–Y phase in the output circuit thereof which is applied to the control grid 64 of the color picture tube 21.

The reduced current flow through the demodulator tube 41 due to the positive-going pulse envelope at the cathode thereof cause a reduced current flow through the resistor of the common impedance 47 and a reduction in the potential at the cathode jointure 45 with respect to circuit ground. The low pass filter 69 prevents the positive-going signal envelope from reaching the cathode of the third amplifier 67 but permits the reduced potential at the cathode jointure 45 to reach the cathode of the amplifier tube 67. This reduction is potential applied to the cathode of the tube 67 appears as a less positive or negative-going potential in the output circuit of the third color difference or G–Y amplifier 67 and is connected therefrom to the control grid 75 of the color picture tube 21.

In the circuitry of the second demodulator tube 43, the phase relationship of the reference oscillation signal applied to the control grid thereof in conjunction with the signal applied by way of the common impedance 47 serves to render conduction of the tube 43 substantially unchanged. As previously explained, the relatively small crosstalk signal which does appear in the cathode circuitry of the second demodulator tube 43 is compensated for and effectively cancelled by proper selection of the phase angle of reference oscillation signal applied to the control grid thereof. Thus, the potential in the anode circuit of the B–Y demodulator tube is substantially unaffected by the application of a chrominance signal representative of a color close to red.

In this manner, the three color difference signals R–Y, B–Y, and G–Y available from the output circuits of the tubes 41, 43, and 67 respectively may be adjusted by varying the reference phase voltages and gains of the demodulator tubes 41 and 43 and the gain of the amplifier tube 67 to provide color difference output signals of a desired amplitude and polarity. Moreover, the color difference signals provided are directly applicable to the first, second, and third grids 64, 65, and 75 of a color picture tube 21.

Although not to be construed as limiting in any manner, the following component values have been found applicable to the synchronous demodulator of FIG. 1:

Tube 41—½ tube type 10JT8
Tube 43—½ tube type 10JT8
Tube 67—½ tube type 10JT8
Resistor, bias network 51—15,000Ω
Resistor, bias network 53—100,000Ω
Impedance 47 resistor—120Ω
Capacitor 47—.01 μμf.

Thus, there has been provided a synchronous demodulation system wherein a maximum output signal is obtainable and directly applicable to the grids of a color picture tube. The employment of a matrix network in the output circuit of the demodulator tubes which tends to form a voltage divider deleteriously affecting the efficiency of the circuitry has been eliminated. Also, the utilization of critical and difficult to manufacture tube components requiring multiple control elements has been eliminated. Moreover, the elimination of additional signal amplification units in conjunction with the utilization of singular control tube components has greatly reduced the cost and increased the efficiency and simplicity of circuitry in a synchronous demodulation system.

While there has been shown and described what is at present considered the preferred embodiment of the invention, it will be obvious to those skilled in the art that various changes and modifications may be made therein without departing from the invention as defined in the appended claims.

What is claimed is:

1. In a color television receiver, a color picture tube having a first, second, and third grid, a source of reference oscillation signals, a source of chrominance signals, means for shifting the phase of said reference signal to a phase $E_1$ lagging the R–Y information in the chrominance signal and a phase $E_2$ leading the B–Y information in the chrominance signal, first, second, and third amplifiers each including a cathode, at least one grid, and an anode, means for applying said reference signal at a phase $E_1$ to the grid of said first amplifier, means for applying the reference signal at a phase $E_2$ to the grid of said second amplifier, means coupled to the grids of the first and second amplifiers for altering the conduction of one with respect to the other, means for applying said chrominance signal through a common impedance to a junction of the cathodes of said first and second amplifiers, means coupling G–Y information appearing at the junction of said first and second amplifiers to the cathode of said third amplifier, means AC coupling the grid of said third amplifier to a reference voltage level, output circuit means coupling a demodulated R–Y signal from the anode of said first amplifier to a first grid of a picture tube, output circuit means coupling a demodulated B–Y signal from the anode of said second amplifier to a second grid of a picture tube, and output circuit means coupling a demodulated G–Y signal from the anode of said third amplifier to a third grid of a picture tube.

2. In a color television receiver having a source of reference oscillation signals, a source of chrominance signals including R–Y and B–Y information, and a color picture tube having a first, second, and third grid, a synchronous demodulation system comprising a first, second, and third amplifier each having a cathode, at least one grid, and an anode, output circuit means coupling a demodulated R–Y signal at a first phase from the anode of said first amplifier to the first grid of the picture tube, output circuit means coupling a B–Y signal at a second phase from the anode of said second amplifier to the second grid of said picture tube, output circuit means coupling a G–Y signal at a third phase from the anode of said third amplifier to the third grid of said picture tube, means coupled to said reference signal source for shifting said signal to a fourth phase lagging said first phase and applying said phase shifted signal to the grid of said first amplifier, means coupled to said reference signal source for shifting said signal to a fifth phase leading said second phase and applying said phase shifted signal to the grid of said second amplifier, means coupled to the grid of said first and second amplifier for increasing conduction of one with respect to the other, impedance means coupling a signal from said chrominance source to a junction common to the cathodes of said first and second amplifiers and from said junction through a filter to the cathode of said third amplifier, and means AC coupling the grid of said third amplifier to a reference voltage level.

3. In a color television receiver having a reference oscillation signal source and a chrominance signal source, a synchronous demodulator comprising a first and second amplifier each having a cathode, control grid, screen grid, suppressor grid, and anode, said suppressor grids and said cathodes being connected to a common junction and each of said screen grids being connected to a positive voltage source, a third amplifier having a cathode, control grid, and anode, an R–Y demodulated signal output circuit coupled to the anode of said first amplifier, a B–Y demodulated signal output circuit coupled to the anode of said second amplifier, a G–Y demodulated signal output circuit coupled to the anode of said third amplifier, means coupling said reference signal source to the control grids of said first and second amplifiers, said means including means for shifting the phase of said signal coupled to the control grid of said first amplifier to a phase $E_1$ leading the R–Y information in a chrominance signal and the phase of said signal coupled to the control grid of said second amplifier to a phase $E_2$ lagging the B–Y information in a chrominance signal and means for altering the conduction of the first and second amplifiers with respect to each other, common impedance means coupling said chrominance signal source to said common junction of said cathodes of said first and second amplifiers, circuit means coupling G–Y information from said common junction of said cathodes to the cathode of said third amplifier, said circuit means including a filter network, and means AC coupling the grid of said third amplifier to a reference voltage and directly coupling said grid to a bias network.

4. In a color television receiver having a reference oscillation signal source and a chrominance signal source, a synchronous demodulator comprising a first, second, and third amplifier each having a cathode, at least one grid, and an anode, means coupling a chrominance signal through a common impedance to a juncture common to the cathodes of said first and second amplifiers, means coupling a reference oscillation signal to the grids of said first and second amplifiers, means coupled to the grids of said first and second amplifiers for shifting the phase of said reference signal with respect to the phase of said chrominance signal, bias means coupled to the grids of said first and second amplifiers for varying the conduction of said amplifiers, said bias means including resistors having a ratio in the range of about 5:1 to 7:1, filter circuit means coupling said common cathode jointure to the cathode of said third amplifier, a demodulated color difference signal output circuit coupled to the anode of said first amplifier, a demodulated color difference signal output circuit coupled to the anode of said second amplifier, and a demodulated color difference signal output circuit coupled to the anode of said third amplifier.

References Cited

UNITED STATES PATENTS

| | | | |
|---|---|---|---|
| 2,845,481 | 7/1958 | Lockhart | 178—5.4 |
| 2,938,071 | 5/1960 | Pritchard | 178—5.4 |

JOHN W. CALDWELL, *Primary Examiner.*

J. A. O'BRIEN, R. MURRAY, *Assistant Examiners.*